United States Patent [19]

Miki et al.

[11] 4,191,432
[45] Mar. 4, 1980

[54] SEAL ASSEMBLY FOR BEARING

[75] Inventors: Toshio Miki, Yaoshi; Yoshiki Fujita, Ikomagun; Yoshihisa Kawakami, Kashiwarashi, all of Japan

[73] Assignee: Koyo Seiko Company Limited, Osaka, Japan

[21] Appl. No.: 951,268

[22] Filed: Oct. 12, 1978

Related U.S. Application Data

[63] Continuation of Ser. No. 836,653, Sep. 26, 1977, abandoned.

[51] Int. Cl.² ............................................. F16C 33/76
[52] U.S. Cl. .................................. 308/187; 308/187.2
[58] Field of Search .................. 308/187.2, 187.1, 187, 308/36.1–36.5; 277/53, 55–57, 84, 94–96, 170

[56] References Cited

U.S. PATENT DOCUMENTS

| | | | |
|---|---|---|---|
| 3,414,275 | 12/1968 | Takahashi | 308/187.2 X |
| 3,572,857 | 3/1971 | Hasegawa | 308/187.2 |
| 3,642,335 | 2/1972 | Takahashi et al. | 308/187.1 |
| 3,792,912 | 2/1974 | Howe, Jr. et al. | 308/187.2 |

FOREIGN PATENT DOCUMENTS

| | | |
|---|---|---|
| 39-20002 | 7/1964 | Japan . |
| 1181045 | 2/1970 | United Kingdom . |

*Primary Examiner*—Douglas C. Butler
*Attorney, Agent, or Firm*—Mason, Fenwick & Lawrence

[57] ABSTRACT

An annular seal member secured to an outer ring is formed on its inner periphery with a highly flexible seal lip extending radially inwardly thereof along the side face of a peripheral stepped portion in the shoulder of the inner ring and spaced apart from the side face by a small clearance. The seal lip has an annular projection axially projecting from the inner side of its inner peripheral portion and lightly in contact with the side face of the stepped portion of the inner ring. The inner peripheral face of the seal lip and the peripheral bottom face of the stepped portion opposed to, and spaced apart by a small clearance from, the inner peripheral face are tapered axially inwardly of the inner ring. The tapered inner peripheral face of the seal lip is not greater than the tapered bottom face of the stepped portion in axial length. The bearing has improved dustproofness, leakproofness and rotation performance afforded by the seal assembly.

2 Claims, 9 Drawing Figures

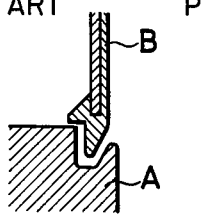
FIG. 1 (a) PRIOR ART
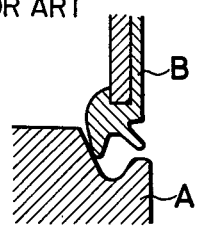
FIG. 1 (b) PRIOR ART
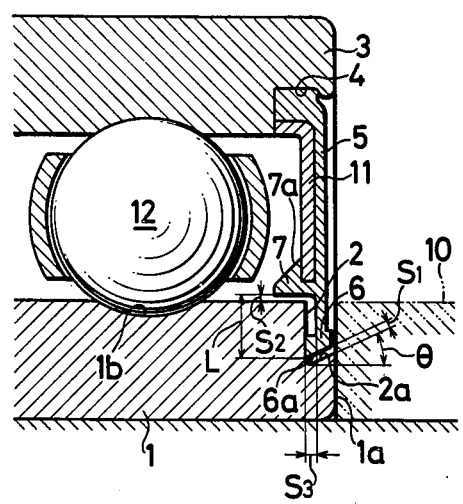
FIG. 2(a)
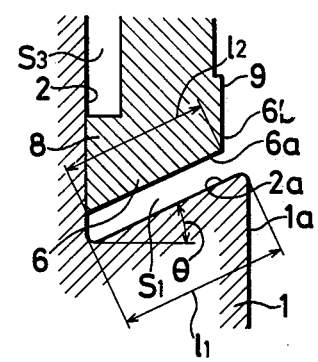
FIG. 2(b)
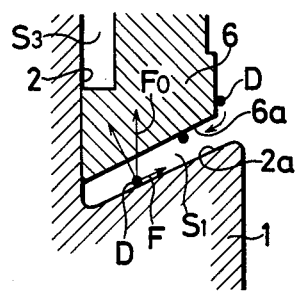
FIG. 3

SEAL ASSEMBLY FOR BEARING

This is a continuation of application Ser. No. 836,653, filed Sept. 26, 1977, which is now abandoned.

BACKGROUND OF THE INVENTION

The present invention relates to seal assemblies for bearings, and more particularly to seal assemblies including an annular seal member secured at its outer periphery to the inner periphery of one end of the outer ring of an anti-friction bearing and having an inner peripheral seal lip part of which is lightly in contact with the inner ring.

Seals for anti-friction bearings must have high sealing properties while rendering the inner or outer ring rotatable by the lowest possible starting torque.

For this purpose, Japanese Utility Model Publication No. 20002/1964, for example, proposes a seal structure in which radial and axial labyrinths are combined to provide a clearance of increased length between the inner ring and the seal lip of an annular seal member. Thus the proposal contemplates an improved sealing function afforded by the complexity of the structure.

A seal assembly of another structure has been proposed and introduced into use as disclosed, for example, in the specification of U.S. Pat. No. 3,113,814. With reference to FIG. 1(a) showing the seal assembly, an annular seal member B has a seal lip which is positioned in a peripheral groove formed in the shoulder of an inner ring A, the seal lip being held out of contact with the grooved portion to provide a continuous labyrinth clearance extending radially and axially of the inner ring B.

Generally, anti-friction bearings such as deep groove ball bearings have a very great axial clearance which is five to ten times as large as the radial clearance thereof. To give an improved sealing function to a sealing assembly such as one shown in FIG. 1(a), the axial clearance between the grooved portion of the inner ring A and the seal lip must be minimized, but since the axial clearance of the bearing is very great as stated above, the seal lip will contact the side face of the grooved portion during the rotation of the bearing, if the axial clearance therebetween is reduced. Such contact will result in an abrupt increase in the rotation torque of the bearing, consequently leading to a marked rise in the temperature of the bearing and to increased wear of the seal lip. The rise of temperature will reduce the consistency of the grease or like lubricant enclosed in the bearing, rendering the lubricant more susceptible to leak.

To eliminate such drawbacks, the axial clearance between the side face of the grooved portion of the inner ring A and the seal lip may be made greater than the axial clearance of the bearing, but the labyrinth will then have a greatly reduced function, failing to prevent leakage of the lubricant and to exclude water, dust or like foreign matter. Thus, the seal lip will not be satisfactorily serviceable. The axial clearance of the bearing varies with the magnitude and direction of the load on the bearing. Further since the axial clearance between the seal lip and the side face of the inner ring grooved portion varies with the dimensional accuracy and assembly accuracy of the inner ring and of the seal, it is extremely difficult to properly adjust the clearance, and the seal is not always mountable in place. Seal assemblies of the non-contact type such as one shown in FIG. 1(a) therefore have inevitable drawbacks described above.

Accordingly when especially high sealing properties are required, sealing assemblies of the contact type are used, in which the inner peripheral seal lip of an annular seal member is entirely or partially adapted for sliding contact with part of the inner ring, as disclosed in the specifications of U.S. Pat. No. 3,245,735 and U.S. Pat. No. 2,310,607, etc. FIG. 1(b) shows a seal assembly of the contact type disclosed in the specification of British Pat. No. 1,181,045. It is seen that the lip of a seal ring B' has a relatively short radial length and a large width and therefore has high rigidity, failing to fully follow the axial displacement especially of the inner ring A'. Thus even the slightest increase in contact, when resulting from a relative axial displacement between the inner and outer rings or from reduced accuracy involved in mounting the seal ring, will entail an increase in the rotation torque of the bearing or an increase in the bearing temperature. The seal assemblies of this type are usable only for a greatly limited range of applications in which these drawbacks are justifiable.

On the other hand, bearings have found increasing use and are used with increasing frequency at high speeds in recent years. In fact, there is a growing demand for anti-friction bearings incorporating seal means which is outstanding in sealing properties and durability and which assures high rotation performance of the bearing. However, conventional seal assemblies of the non-contact type as well as of the contact type described above are unable to fulfil all of these requirements because of their inherent drawbacks. Additionally, the seal assemblies must be adapted for effective exclusion of foreign matter.

SUMMARY OF THE INVENTION

An object of this invention is to provide a seal assembly full fulfilling the foregoing requirements which the seal means heretofore known were unable to meet.

Another object of this invention is to provide a seal assembly which fulfils the foregoing requirements and has the simplest possible structure and which is therefore easy to make and assemble.

Another object of this invention is to provide a seal assembly which involves greatly reduced variations in its leakproofness, dustproofness and ability to ensure high rotation performance of the bearing.

Still another object of this invention is to provide a seal assembly which achieves the above objects and which has improved durability.

The seal assembly of this invention comprises an annular seal member having its outer periphery secured to the inner periphery of one end of an outer ring and formed with a seal lip on its inner periphery. The seal lip extends radially inwardly of the seal member along the side face of a peripheral stepped portion provided in the shoulder of an inner ring and having a great depth radially of the inner ring, with a small clearance formed between the side face and the lip. The seal lip has the smallest possible thickness and is thereby rendered highly flexible axially of the seal ring. The seal lip is further formed on the inner side of its radially inner peripheral portion with an axially projecting annular projection lightly in contact with the side face of the inner ring stepped portion. The peripheral bottom face of the stepped portion and the inner peripheral face of the seal lip opposed to the bottom face as spaced apart therefrom by a small clearance are each in the form of a surface tapered axially inwardly of the inner ring, namely having an increasing diameter toward the axially outer end of the inner ring. The tapered inner peripheral face of the seal lip is not greater than the tapered bottom face of the stepped portion in axial length.

Thus the seal lip forms a labyrinth between the lip and the side face of the peripheral stepped portion. The radially inner end of the labyrinth is closed by the annular projection. The small clearance between the inner peripheral face of the seal lip and the peripheral bottom face of the stepped portion provides another labyrinth which has an increasing diameter toward the axially outer end of the inner ring.

Because the seal lip has the smallest possible thickness and the greatest possible radial length, the seal lip is very flexible, permitting the annular projection to contact the side face of the stepped portion with a greatly reduced pressure, producing little or no influence on the rotation torque of the bearing. In fact, the rotation torque involved is almost comparable to that involved in the completely non-contact state of seal means of the non-contact type. Accordingly the rise of temperature due to the contact of the annular projection is almost negligible.

The labyrinth defined by the inner side face of the seal lip and the side face of the stepped portion, which is closed at its radially inner end by the annular projection, perfectly prevents the leak of the lubricant confined in the bearing. Because the labyrinth defined by the inner peripheral face of the seal lip has an increasing diameter toward its outer end, the water, dust or like foreign matter ingressing into the labyrinth can be excluded by the centrifugal force resulting from the rotation of the bearing. This assures substantially enhanced dustproofness.

The annular projection, with its contact pressure greatly minimized, causes hardly any heat generation or rise of temperature and produces little or no objections such as wear, rendering the seal assembly not only serviceable over a remarkably prolonged period of time but also simple to make and assemble. The assembly is further almost free of variations in contact pressure.

The seal lip, because of its high flexibility, follows the relative axial displacement between the inner and outer ring of the bearing, while the annular projection serves to eliminate alterations in the inner labyrinth clearance. Even if the annular projection comes out of contact with the side face of the inner ring stepped portion, the tapered labyrinth between the inner peripheral face of the seal lip and the peripheral bottom face of the stepped portion will then reduce, thus ensuring satisfactory leakproofness and dustproofness.

Other objects and features of this invention will become more apparent from the following description.

BRIEF DESCRIPTION OF THE DRAWINGS

FIG. 1(a) is a vertical section through a conventional seal assembly;

FIG. 1(b) is a vertical section through a second type conventional seal assembly;

FIG. 2(a) is a vertical section through the preferred embodiment of the present invention;

FIG. 2(b) is an enlarged view of a portion of FIG. 2(a);

FIG. 3 is an enlarged view in vertical section of the main part to illustrate dust exclusion achieved by the present invention;

DESCRIPTION OF THE PREFERRED EMBODIMENTS

Figure 4:
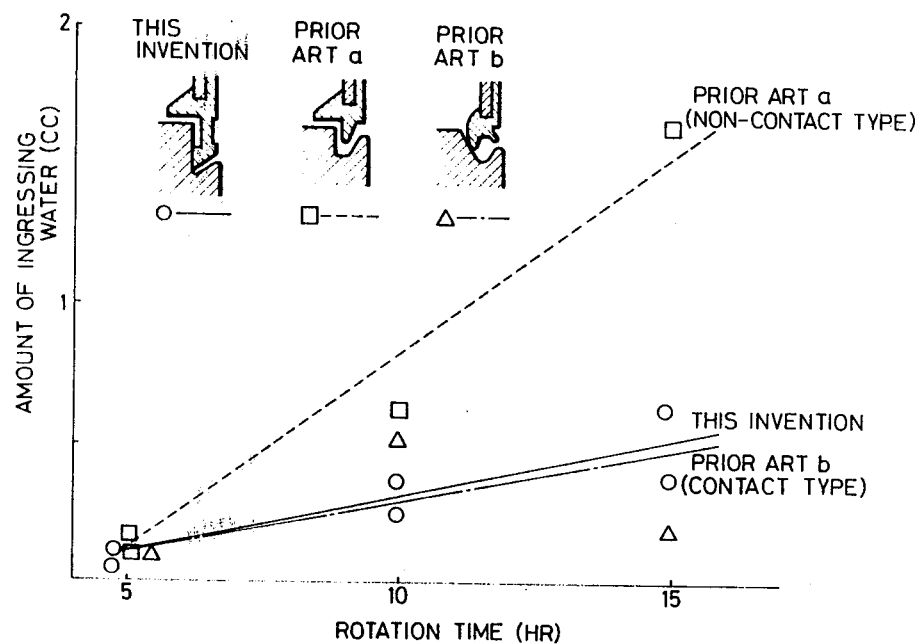
FIGS. 4 to 8 are graphs showing the results of experiments in which the seal assembly of this invention and conventional seal structures were tested for dustproofness, leakproofness and rotation performance.

With reference to FIGS. 2(a) and (b) showing an embodiment of this invention, the inner ring 1 of a bearing is formed in its shoulder with a peripheral stepped portion 2 having a great depth radially thereof. An annular seal member 5 reinforced with a metal core 11 is securely fitted at its outer periphery in a peripheral groove 4 formed in the inner periphery of one end of an outer ring 3.

The annular seal member 5 is provided on its inner periphery with a seal lip 6 extending radially inwardly thereof along the stepped portion 2 as spaced apart from the side face of the portion 2 by a small clearance $S_3$. The seal lip 6 has the greatest possible radial length L and the smallest possible thickness so as to have reduced rigidity and so that the labyrinth provided by the small clearance $S_3$ will have the greatest possible length in the radial direction. The seal lip 6 has an annular projection 8 projecting from the inner side of its inner peripheral portion and lightly in contact with the side face of the stepped portion 2 to close the radially inner end of the clearance $S_3$.

The peripheral bottom face 2a of the stepped portion 2 is in the form of a tapered surface sloped at an angle $\theta$ with respect the axis of the inner ring 1 and having an increasing diameter toward the axially outer end of the inner ring 1. Opposed to the bottom face 2a is the inner peripheral face 6a of the seal lip 6 which is similarly in the form of a tapered surface. The tapered face 6a is spaced apart from the face 2a by the specified clearance $S_1$. The length $l_2$ of the tapered inner peripheral face 6a of the seal lip is not greater than the length $l_1$ of the tapered bottom face 2a of the stepped portion. Thus, the outer side face 6b of the seal lip 6 is positioned slightly inward from the outer end face 1a of the inner ring 1.

In addition to the radially inwardly extending seal lip 6, the annular seal member 5 has another seal lip 7 extending axially inwardly of the bearing along the outer peripheral surface of the inner ring 1 as spaced apart from the ring surface by a small clearance $S_2$. The seal lip 7 has an outer peripheral face 7a which is so sloped that the flow of grease or like lubricant caused by the rotation of the bearing will be guided inwardly of the bearing, namely toward the raceway surface 1b for rolling members 12. The small clearance $S_2$ is in communication with the small clearance $S_3$ to provide a bent labyrinth and to prevent the outflow of the lubricant from the bearing. Since the labyrinth is bent as above with its radially inner end closed by the annular projection 8, the outflow of the lubricant can be prevented with improved effectiveness. The clearances $S_2$, $S_3$ and $S_1$ form a substantially Z-shaped labyrinth extending across the annular projection 8.

The radially inwardly extending seal lip 6 of the annular seal member 5 has another annular projection 9 slightly projecting axially from the outer side of its inner peripheral portion. The shaft on which the bearing is to be mounted may be provided with a stepped portion or collar 10 whose outside diameter is greater than the outside diameter of the bottom face 2a of the stepped portion 2 so that the seal lip 6 will contact the shaft stepped portion or collar. In such an event, the annular projection 9 will lightly contact the collar, substantially eliminating abnormal torque or rise of temperature which would otherwise occur.

The metal core 11 reinforcing the annular seal member 5 has an inside diameter greater than the outside diameter of the inner ring 1, permitting the seal lip 6 to have a sufficient length L and therefore high flexibility, so that the annular projection 8 will contact the side face of the stepped portion 2 with minimized pressure with reduced variations in the contact pressure. On the other hand, the metal core 11 reinforces the seal lip 7 extending from the seal member 5 axially inwardly of the bearing. The pressure exerted by the annular projection 8 is very low and involves a minimized frictional force. The resulting increment of the starting torque of the bearing is almost negligible, while the friction entails materially reduced wear or temperature rise, if any.

FIG. 3 illustrates the dustproofness achieved by the foregoing embodiment. Droplets of water, dust or like foreign matter D may descend the outer side of the annular seal member 5 and ingress into the clearance $S_1$ defined by the tapered faces 6a and 2a, but the foreign matter will be subjected to the centrifugal force $F_0$ and forced out from the bearing by a component F along the tapered face 6a. The reaction due to gravity, although acting on the foreign matter D, is very low in the usual state of operation and is therefore negligible relative to the centrifugal force $F_0$ or component F. Thus, the droplets of water or dust particles which may ingress into the labyrinth defined by the tapered faces 6a and 2a can be effectively excluded from the bearing.

On the other hand, if the annular projection 8 comes out of contact with the side face of the stepped portion 2 due to a relative axial displacement between the inner and outer rings, the displacement will reduce the clearance between the tapered faces 6a and 2a, whereby sufficient sealing effects, namely leakproofness and dustproofness will be achieved. Moreover, the provision of the annular projection 8 serves to minimize at all times the area of contact between the seal lip and the inner ring in the presence of the axial displacement of the inner and outer rings relative to each other, while effectively preventing the ingress of foreign matter and leak of the lubricant.

The Z-shaped labyrinth defined by two seal lips of the annular seal member 5, i.e. by one extending axially from its inner periphery and the other extending radially therefrom, affords high leakproofness by guiding the flow of lubricant inwardly of the bearing, thus achieving a great improvement over the conventional seal means in FIGS. 1(a) and (b).

FIG. 4 is a graph showing the results of an experiment in which the seal assembly of FIG. 2 and the conventional assemblies of FIGS. 1(a) and (b) were incorporated into single row deep groove ball bearings and tested for sealing effects, especially for foreign matter exclusion.

The bearings were rotated in an atmosphere containing suspended particles of water in the form of a mist. The amount of water ingressing into the bearing was determined by measuring the weight of the bearing before and after the rotation test. The test was conducted under the following conditions:

Bearing tested: JIS #6206
Load: No load
Number of revolutions: 1800 r.p.m.
Rotation time: For 3 hours
Atmosphere: In mist of water, at room temp.

FIG. 4 reveals that with respect to foreign matter excluding effect the seal assembly of this invention is much superior to the conventional device of the non-contact type (FIG. 1(a)) and is comparable to the conventional contact-type device (FIG. 1(b)).

Figure 5:
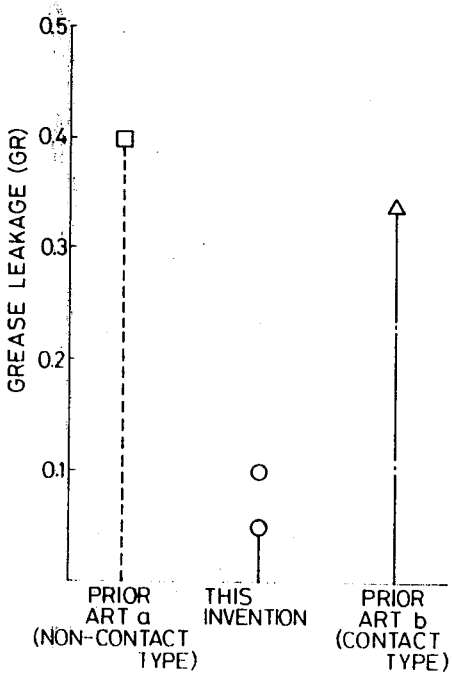

FIG. 5 shows the results of an experiment in which the seal assemblies were tested for the leakage of grease. It is seen that the sealing assembly of this invention is exceedingly less susceptible to leak of grease than the conventional devices (a) and (b). This evidences the outstanding leakproofness of the present device.

Figure 6:
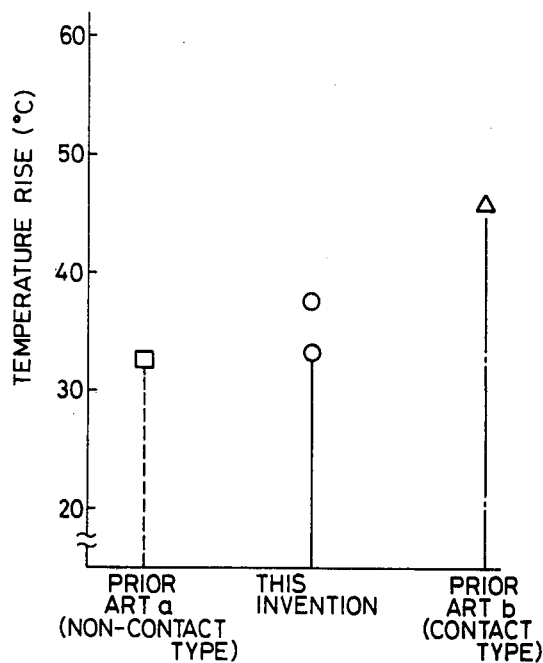

FIG. 6 shows the results of an experiment in which the bearings were tested for rise of temperature. The graph indicates that the rise of temperature taking place in the bearing incorporating the present seal assembly is much lower than that experienced with the use of the contact-type conventional device (b) and is slightly higher than that occurring in the conventional non-contact type (a).

Figure 7:
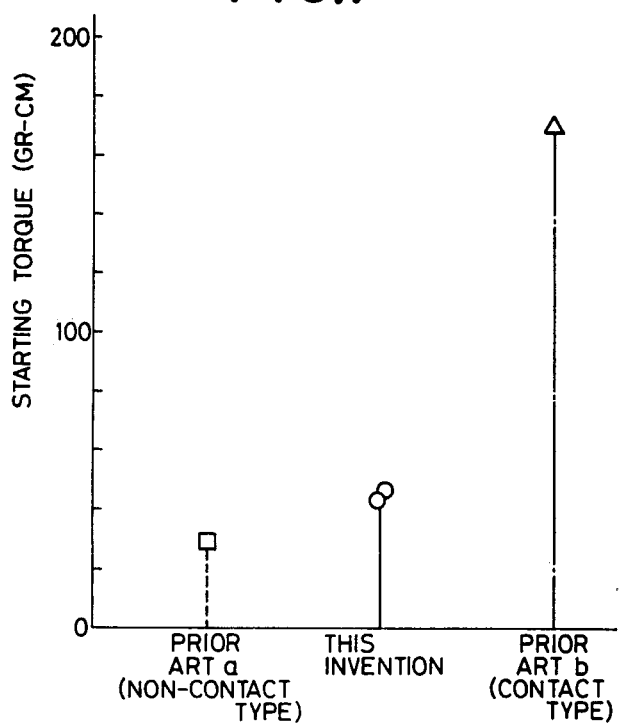

FIG. 7 shows the results of an experiment in which the bearings were tested for starting torque. The starting torque of the bearing according to the present invention is about ¼ that of the conventional contact type (b) and slightly greater than that of the conventional non-contact type (a).

Figure 8:
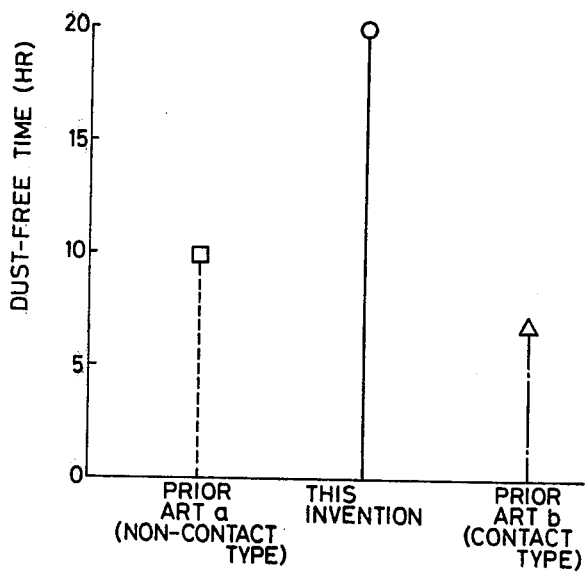

FIG. 8 shows the results of an experiment conducted for the evaluation of dustproofness. The graph shows that the present seal assembly is at least twice as high as the conventional device of either type in dustproofness.

In these experiments, the leak of grease was determined in terms of difference in the weight of grease enclosed in the bearing before and after the experiment, the starting torque was measured with use of a thread wound around the outer ring and a spring balance, and the rise of temperature was continuously measured by a thermocouple attached to the outer periphery of the outer ring.

These tests were conducted under the following conditions:

Bearing tested: JIS #6206
Number of revolutions 3600 r.p.m.
Rotation time: Continuously for 30 hours
Room temperature: 20° to 24° C.

The experiment for the evaluation of dustproofness was carried out by placing the bearing in an atmosphere, about 1 $m^3$ in volume, containing suspended particles of dust. The dustproofness was evaluated in terms of "dust-free time" which means the period of time during which the bearing continues to operate free of any trouble due to the ingress of dust. The dust-free time was determined by measuring an increase in the vibration of the bearing. The test was conducted under the following conditions:

Bearing tested: JIS #6206
Number of revolutions: 1800 r.p.m.
Dust: Dry alumina powder
Room temperature: 30° to 35° C.

According to this invention, the tapered inner peripheral face of the radially inwardly extending seal lip of the seal member has a length not greater than the tapered bottom face of the inner ring stepped portion. With this structure, therefore, the outer side face 6b of the seal lip 6 usually will not contact the side face of a stepped portion or locking collar on the shaft on which the bearing is to be mounted. In the case where the bearing is mounted with its inner ring 1 in contact with the collar 10 as shown in the phantom line in FIG. 2(a), a labyrinth will be formed between the outer side face 6b of the lip 6 and the collar side face, giving enhanced leakproofness and dustproofness.

Even when the seal lip 6 is brought close to the side face of the shaft stepped portion or of the locking collar due to a marked axial displacement of the inner and outer rings relative to each other under an unusually great thrust load, the projection 9 on the outer side of the seal lip 6 will come into slight contact with the side face of the collar without giving rise to a marked increase in the torque, thereby assuring stabilized rotation performance.

The peripheral stepped portion formed in the shoulder of the inner ring 1 can be substituted by a circumferential groove which may be formed in the inner ring shoulder without departing from the scope of this invention.

Figure 9:
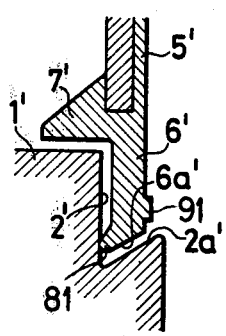
FIG. 9(a) is an enlarged sectional view of another embodiment of the present invention.
FIG. 9(b) is an enlarged sectional view of still another embodiment of the present invention.
FIG. 9(c) is an enlarged sectional view of yet another embodiment of the present invention.
FIG. 9(d) is an enlarged sectional view of a further embodiment of the present invention.
Figure 9:
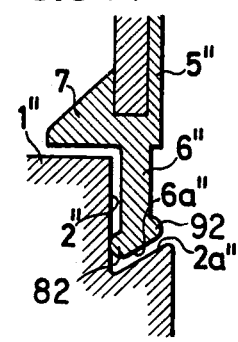
Figure 9:
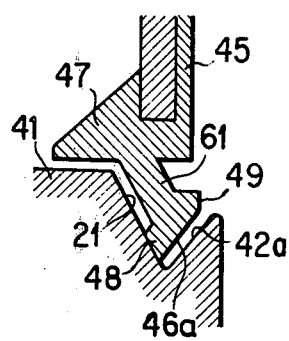
Figure 9:
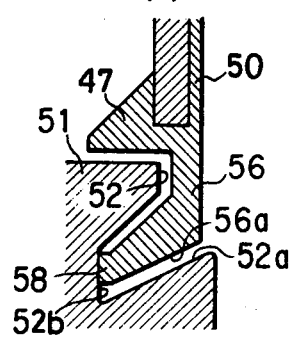

FIG. 9(a) illustrates another embodiment of the invention in which the seal lip 6' of seal 5' has an annular projection 81 of minimized radial width for contact with the side face of the stepped portion 2' of an inner ring 1' so as to substantially reduce area contact and reduce the frictional torque. Additionally, it will be observed that the pripheral bottom face 2a', the seal lip 7' and the inner peripheral face 6a' correspond to the elements 2a, 7 and 6a of the first embodiment. Similarly, the annular projection 91 on the outer side of the lip has a radially reduced width.

FIG. 9(b) illustrates another embodiment wherein annular projections 82 and 92 have a semi-circular outer configuration for the purpose of reducing the frictional torque. Also, the elements 1",2",2a",6",6a" and 5" correspond respectively with the elements 1,2,2a,5,6 and 6a of the first embodiment.

FIG. 9(c) illustrates another embodiment in which the peripheral stepped portion is provided by a V-shaped groove 21 circumferentially formed in the shoulder of the inner ring 41. A seal lip 61 is formed with an annular projection 48 having an end face lightly contacting the sloped side face of the V-shaped groove 21. The other sloped face of the groove 21 comprises a peripheral bottom face 42a. The seal also includes an annular projection 49 corresponding to the projection 9 of the first embodiment. The seal 45 also includes a seal lip 47 corresponding to seal lip 7 of the first embodiment with the inner peripheral face 46a corresponding to face 6a of the first embodiment.

FIG. 9(d) illustrates an inner ring 51 having a stepped portion 52 with a side face axially recessed to provide an annular groove 52b. A seal lip 56 is formed with an inner peripheral annular projection 58 on the seal 50 which is in light contact with the bottom of the groove 52b to reduce friction. A labyrinth is defined by seal lip 57, 56 and the inner ring 51 so as to increase the length of passage of any lubricant to ensure an enhanced sealing function. It will be noted that the seal lip 56 of FIG. 9(d) is not provided with an annular projection on the outer side of its inner peripheral portion. The outer annular projection can be dispensed with when the outer side face of the radially inwardly extending seal lip is unlikely to contact a shaft stepped portion or a collar. The elements 56a and 52a respectively correspond to elements 6a and 2a of the first embodiment.

What is claimed is:

1. A seal assembly for an anti-friction bearing comprising: an inner ring formed with a shoulder including a peripheral stepped portion having a great depth radially inwardly of the periphery of the inner ring, a side face and a peripheral bottom face tapered axially inwardly of the inner ring and having an increasing diameter toward the axially outer end of the inner ring and an annular seal member having its outer periphery secured to the inner periphery of one end of an outer ring and reinforced with a metal core, said metal core having an inside diameter greater than the outside diameter of the inner ring, the annular seal member having on its inner periphery a first elongated flexible seal lip extending radially inwardly thereof linearly along the side face of the stepped portion of the inner ring with a small clearance formed between the first elongated flexible seal lip and the side face and a second seal lip projecting axially inwardly of the bearing along the outer periphery of the inner ring with a small clearance formed between the second seal lip and the outer periphery of the inner ring whereby the flow of the lubricant enclosed in the bearing is guided axially inwardly of the bearing, the first seal lip having an annular projection axially projecting from the inner side of its inner peripheral portion lightly in contact with the side face of the inner ring stepped portion and another annular projection axially projecting from the outer side of its inner peripheral portion, the first seal lip further having a tapered inner peripheral face positioned to provide small clearance between the tapered inner peripheral face and the peripheral bottom face of the stepped portion, the first seal lip tapered inner peripheral face having an axial length not greater than the axial length of the tapered bottom face of the stepped portion.

2. A seal assembly as defined in claim 1 wherein the stepped portion of the inner ring is a V-shaped groove circumferentially formed in the shoulder of the inner ring and having inner and outer sloped faces wherein the annular projection on the inner side of the first seal lip is lightly in contact with the inner side face of the V-shaped groove.

* * * * *